(12) United States Patent
Jacobs et al.

(10) Patent No.: US 9,779,241 B2
(45) Date of Patent: Oct. 3, 2017

(54) SYNCHRONIZATION OF UEFI SECURE BOOT VARIABLES ON A MANAGED SERVER

(71) Applicant: Cisco Technology, Inc., San Jose, CA (US)

(72) Inventors: William E. Jacobs, Beaverton, OR (US); Kurt W. Bailey, Beaverton, OR (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 14/036,417

(22) Filed: Sep. 25, 2013

(65) Prior Publication Data

US 2015/0089209 A1   Mar. 26, 2015

(51) Int. Cl.
*G06F 21/57* (2013.01)

(52) U.S. Cl.
CPC .......... *G06F 21/572* (2013.01); *G06F 21/575* (2013.01)

(58) Field of Classification Search
CPC .................................................... G06F 21/572
USPC ................................................................ 713/1
See application file for complete search history.

(56) References Cited

U.S. PATENT DOCUMENTS

| | | | | |
|---|---|---|---|---|
| 6,122,733 | A * | 9/2000 | Christeson | G06F 9/4401 713/2 |
| 7,293,169 | B1 * | 11/2007 | Righi | G06F 8/65 709/220 |
| 2008/0275921 | A1 * | 11/2008 | Gunabalasubramaniam | G06F 11/1417 |
| 2009/0132799 | A1 * | 5/2009 | Brumley | G06F 9/44505 713/100 |
| 2012/0260082 | A1 * | 10/2012 | Bobzin | G06F 9/4411 713/100 |
| 2014/0189336 | A1 * | 7/2014 | Ballesteros | G06F 21/575 713/2 |
| 2014/0380031 | A1 * | 12/2014 | Jones | G06F 21/572 713/2 |

OTHER PUBLICATIONS

Errata C, "Unified Extensible Firmware Interface Specification," Version 2.3.1, Unified EFI, Inc., Jun. 27, 2012, 45 pages.

* cited by examiner

*Primary Examiner* — Jaweed A Abbaszadeh
*Assistant Examiner* — Sumil Desai
(74) *Attorney, Agent, or Firm* — Edell, Shapiro & Finnan, LLC (57) ABSTRACT

Techniques are provided for actively managing secure boot variables. Such techniques include receiving a request from an entity to modify a portion of a basic input/output system (BIOS), the request including a data segment, and verifying that the requesting entity is authorized to modify a portion of the BIOS. In response to verifying that the requesting entity is authorized, the portion of the BIOS is modified based on the received request and the data segment, and a copy of the data segment is stored in a file on a physical memory that is communicatively coupled to the BIOS. If the BIOS is updated, thereby erasing part or all of the secure boot variables that are stored in the BIOS, the record of changes of the secure boot variables along with default authenticated variables may be used to restore the secure boot variables to a state prior to the BIOS update.

20 Claims, 11 Drawing Sheets

SYNCHRONIZATION OF UEFI SECURE BOOT VARIABLES ON A MANAGED SERVER

TECHNICAL FIELD

The present disclosure relates to management of secure boot variables, and in particular, actively managing secure boot variables.

BACKGROUND

A Unified Extensible Firmware Interface (UEFI) secure boot protocol (as indicated in UEFI Specification Version 2.3.1c, Approved June 2012 or higher) provides that authenticated variables be created within a basic input/output system (BIOS) to hold signature lists for authorized software (e.g., "white lists") and/or forbidden software (e.g., "black lists") for access control purposes (e.g., to prevent introduction of unauthorized code into the BIOS). This approach provides the ability to authenticate UEFI images (e.g., UEFI-aware Operating System (OS) loaders) as part of a UEFI secure boot authentication process prior to loading and executing such images on a particular computing device. OS vendors or other entities with appropriate credentials may update the white and/or black lists during runtime. For example, during OS runtime, the OS may change the contents of the white and/or black lists from their respective factory default settings, altering which drivers or other software are permitted to run on a computing device. The lists or databases are typically stored in non-volatile random-access memory (NVRAM) on the BIOS. However, if the BIOS is updated (e.g., "flashed over" or otherwise erased), the contents of the lists or databases may be overwritten, thereby destroying the changes made by the OS or other authorized entity.

DESCRIPTION OF EXAMPLE EMBODIMENTS

Overview

Techniques are provided for actively managing secure boot variables, in which a record of changes to the secure boot variables is created and stored in a separate physical memory from the BIOS. In the event that the BIOS is updated, thereby erasing part or all of the secure boot variables that are stored in the BIOS, the record of changes of the secure boot variables along with default secure boot or authenticated variables may be used to restore the secure boot variables to a state prior to the BIOS update (e.g., an asynchronous BIOS update). These techniques may be embodied as a method, apparatus or instructions in a computer-readable storage media comprising: at a managed server, receiving a request from an entity to modify a portion of a basic input/output system (BIOS), the request including a data segment, and verifying that the requesting entity is authorized to modify a portion of the BIOS. In response to verifying that the requesting entity is authorized to modify the portion of the BIOS, the portion of the BIOS is modified based on the received request and the data segment, and a copy of the data segment is stored in a file on a baseboard management controller (BMC) that is communicatively coupled to the BIOS.

Example Embodiments

The techniques presented herein involve management of secure boot variables on a managed server, and provide a method, apparatus and computer readable media for synchronizing UEFI secure boot variables on the BIOS with the BMC. In one aspect, the method captures data associated with an Application Programming Interface (API) function call that enables access to secure boot variables within the BIOS. Entities, e.g., an OS, that have the capability to interface with the API function call may send a request to modify a portion of the BIOS. The secure data associated with the function call are recorded (stored) in a file, and at some subsequent time, selectively sent or "played back" by the BIOS using the same API function call and associated secure data, thereby restoring the secure boot variables from the file.

UEFI secure boot (e.g., per UEFI Specification Version 2.3.1c or higher) provides that authenticated variables be created to hold signature lists for authorized and forbidden third-party or other software in order to control access to the BIOS or other firmware. Such authenticated variables (also referred to throughout as secure boot variables) may include variables that store lists or databases corresponding to a platform key, key exchange keys, white lists, and black lists. For example, in one embodiment, a managed server may receive a request comprising a UEFI boot variable. Access to these lists or databases requires authentication, thereby preventing modification by unauthorized parties. For example, a platform key may facilitate authentication of the lists. Moreover, the signature lists (e.g., white and/or black lists) can be used by the BIOS to authenticate loading of BIOS/UEFI drivers such as an OS loader (e.g., WINDOWS® 8 boot loader), and/or third-party UEFI I/O device drivers (formerly known as OptionROMS) to prevent injection of non-authentic or malicious code into the BIOS. Non-authentic code in the BIOS may execute a Denial of Service (DoS) attack, capture control of the BIOS, inject unauthorized root kit code, or perform some other malicious activity.

Typically, static or default signature lists are created during build time in a factory setting, and, at that time, the static structure of the lists are injected into the BIOS image. The injected lists are built or converted into UEFI authenticated variables by the BIOS, and as previously mentioned, subsequent access to this data typically requires authentication. Importantly, at OS runtime, the OS may utilize predefined API function calls as part of BIOS services to update, e.g., the white and/or black lists, in order to change which drivers (e.g., OS loaders, etc.) are allowed by the BIOS. Such changes made at runtime are preferably preserved across BIOS updates and platform reboots.

In a managed server environment, such as Cisco Unified Computing System (UCS)®, a custom scheme is provided for updating BIOS images. This scheme may not be managed by the OS itself, e.g., the scheme may be asynchronous. Rather, updates may be performed in a manner that bypasses the OS, for instance, by a Cisco UCS® manager. In such an arrangement, the OS may not have any knowledge that a BIOS update is occurring or be able to control the BIOS change on the platform. In this circumstance, the OS would not have the ability to influence retention of changes that it has made to the secure boot variables (e.g., UEFI secure boot white and/or black lists). Embodiments described herein provide a technique by which to manage secure boot variables outside of the platform's BIOS, such that after a BIOS update occurs, the secure boot variables may be restored, if needed.

Figure 1:
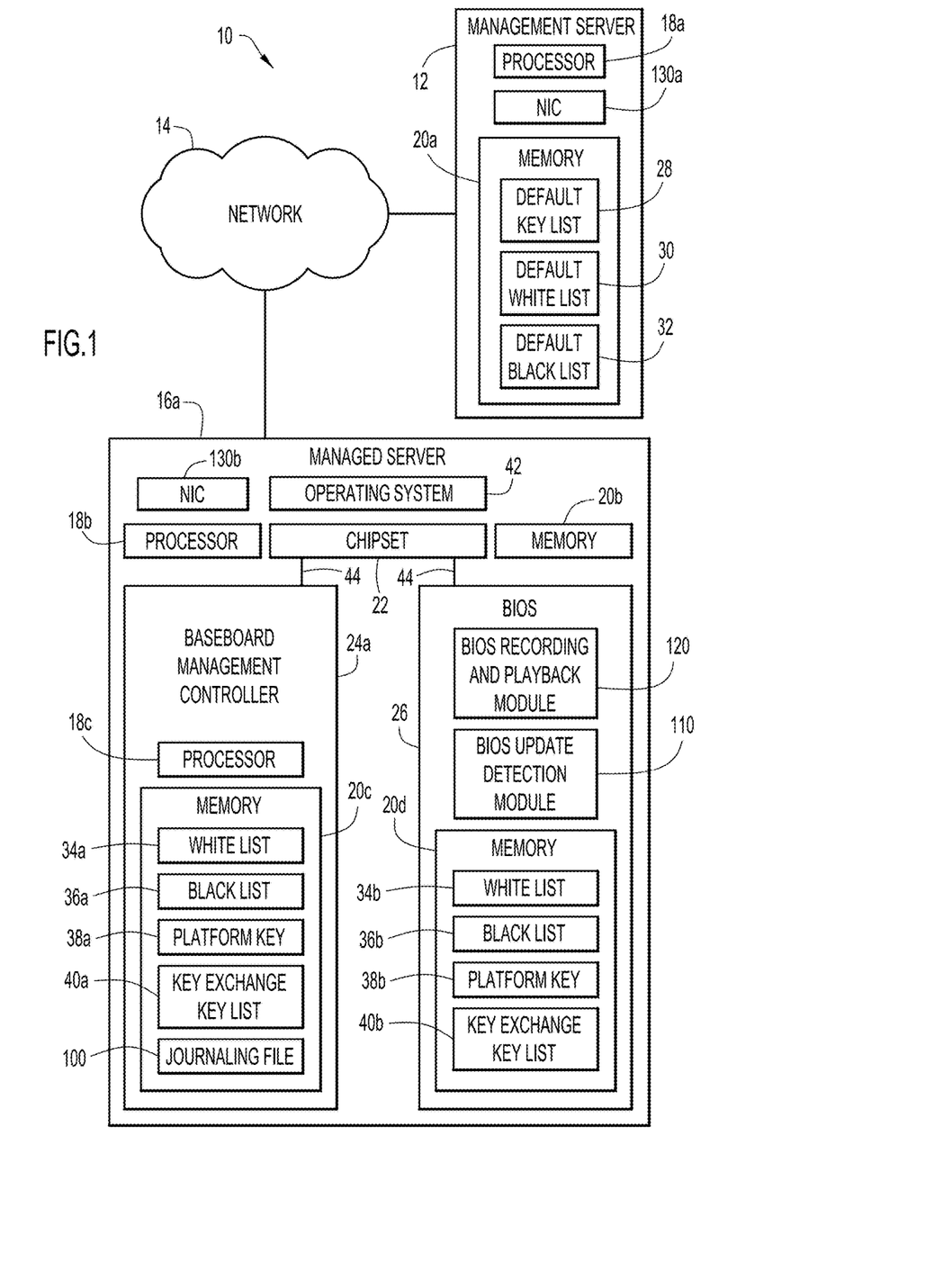
FIG. 1 illustrates an example block diagram of a communication system with secure boot variable synchronization functionality in accordance with the techniques presented herein.

FIG. 1 is an example of a block diagram of a communication system 10 configured for management of BIOS secure boot variables in accordance with one aspect of the present disclosure to resolve the aforementioned issues (and potentially others) associated with BIOS secure boot variables. Communication system 10 may include a management server 12, a network 14, and a managed server 16a.

Management server 12 may include a processor 18a, a memory 20a, and a network interface unit or card (NIC) 130a for receiving and transmitting packets of information across a network. Memory 20a may include a default key list 28, a default white list 30, and a default black list 32. A default key list may contain one or more platform keys or other secure variables. A white list may contain a list of one or more software files that are permitted to run on a managed server. A black list may contain a list of one or more software files that are not permitted to run on a managed server.

Network 14 represents a series of points or nodes of interconnected communication paths for receiving and transmitting packets of information that propagate through communication system 10. For instance, network 14 provides a mechanism for management server 12 to communicate updates to managed server 16a.

Managed server 16a may include a processor 18b, a memory 20b, a chipset 22, a baseboard management controller (BMC) 24a, a BIOS 26, a secure channel 44, an OS 42, and a network interface unit or card (NIC) 130b. NIC 130b is used for receiving and transmitting packets of information across a network. Managed server 16a may further include a journaling or recording file 100, a BIOS update detection module 110, and a BIOS recording and playback module 120, which collectively enable synchronization of secure variable data in the BIOS with secure variable data in the BMC through a "record and playback" functionality, thus, enabling restoration of secure boot variables in the event of a BIOS update (e.g., "flash"). These modules will be described in additional detail below.

BMC 24a may include a processor 18c and a memory 20c. A baseboard management controller (BMC), such as BMC 24a, can be configured to manage UEFI secure boot variables, or any UEFI authenticated variable, by utilizing a proxy storage device (e.g., memory) tied to a server management infrastructure. Memory 20c may be used to store UEFI secure boot variables including a white list 34a, a black list 36a, a platform key 38a, and a key exchange key list 40a. Memory 20c may also contain a journaling or recording file 100. BIOS 26 may include a memory 20d. Memory 20d may include a white list 34b, a black list 36b, a platform key 38b, and a key exchange key list 40b.

Default key list 28 of the management server may include platform keys 38a and 38b for the managed server. Additionally, platform keys 38a and 38b may include the same key. Platform key 38a may be the key to the platform and can be stored as a platform key variable. Platform key 38a can also control access to the platform key variable and a key exchange key variable.

Default white list 30, default black list 32, white lists 34a and 34b, black lists 36a and 36b, platform keys 38a and 38b, and key exchange key lists 40a and 40b may each contain one or more secure variables. Further, white lists 34a and 34b may each include the same white list. Black lists 36a and 36b may each include the same black list. Key exchange key lists 40a and 40b may each include the same key exchange key lists. Additionally, key exchange key lists 40a and 40b may each contain cryptographic keys to facilitate the exchange of cryptographic data. A key exchange key variable contained in key exchange key list 40a may be used to update the white and/or black lists (e.g., signature database) and can be used to update a current list or to sign binary files for valid execution.

UEFI specification provisions control authentication of UEFI drivers. UEFI secure boot provision allows any UEFI image that can be loaded by a UEFI interface (e.g., OS loader, driver, shell, shell application, etc.) to be signed and authenticated. Thus, images can be authenticated before being allowed to load and execute on the BIOS. As examples, UEFI drivers may be needed for add-in cards (e.g., cards that fit into open PCIE slots, such as graphic controllers, storage controller cards, and network interface cards, etc.). Once authenticated, the OS loader can install the OS and run corresponding OS kernel code.

Communication system 10 may be configured to store UEFI secure boot variables on BMC 24a (or in any suitable location). Moreover, BMC 24a can be configured to securely store UEFI secure boot authenticated variable data (e.g., white list 34a and/or black list 36a) in a way that associates the data with a specific managed server (e.g., managed server 16a). For example, BMC 24a can be used to store UEFI secure boot variables in the form of a monolithic signed binary large object (BLOB) or data segment, which may be populated into BMC 24a at provisioning time. As will be appreciated by those skilled in the art, a data segment or BLOB need not be "large" as in a binary large object. The BLOB may be created statically in an off-line secure environment, signed using secure signing services, and then passed to the BMC 24a through an update via network 14.

BMC 24a can provide the BLOB of data to BIOS 26 through a secure channel 44 established across chipset 22 when requested by BIOS 26. For example, when BIOS 26 boots up as part of a power on self-test (POST), BIOS 26 may request or read the BLOB of data from BMC 24a and then use the contents of the BLOB to populate white list 34b, black list 36b, platform key 38b, and key exchange key list 40b in memory 20d. This capability can also enable a management server to modify these lists per deployment (e.g., OS supported, driver revision, blacklisting, etc.).

Typically, secure boot variables such as UEFI boot variables cannot be updated unless the user or entity attempting the update can prove (with a digital signature on a specified payload called a platform key variable or an authentication descriptor) possession of the private part of the key used to create the variable. Thus, BIOS 26 may utilize these variables locally during runtime (per UEFI Specification Version 2.3.1c or higher) to authenticate UEFI drivers and OS loader execution.

Techniques described herein also take into account receiving, recording and/or storing at the BMC 24a, changes to the secure boot variables made during runtime by the BIOS. Runtime changes (e.g., changes made during program execution, such as OS execution) made to UEFI secure boot data in BIOS 26 may be performed in a safe and secure manner. In one example, a secure interface between BIOS 26 and BMC 24a, such as secure channel 44, can be utilized to pass UEFI secure boot variable data. For example, signed BLOB data may be passed from the BIOS 26 to BMC 24a for storage in a journaling file 100. Communication system 10 can also be configured to manage secure boot data via out of band methods with central capabilities of managed platform deployments.

More specifically, BIOS 26 can accommodate updates to white list 34b and black list 36b by authenticated OS accesses (e.g., using platform key 38b or key exchange key list 40b) via, e.g., a pre-defined Application Programming Interface (API) function call. This enables OS 42 to change the contents of white list 34b and black list 36b to control what BIOS 26 allows and disallows on subsequent boot cycles, as per UEFI specifications. As described in additional detail below, the data associated with the API function call to update a secure boot variable of the white and/or black list is stored, and "played back" at a subsequent time, to restore secure boot variables that have been partially or completely erased by an event such as e.g., a "flash over".

Figure 2:
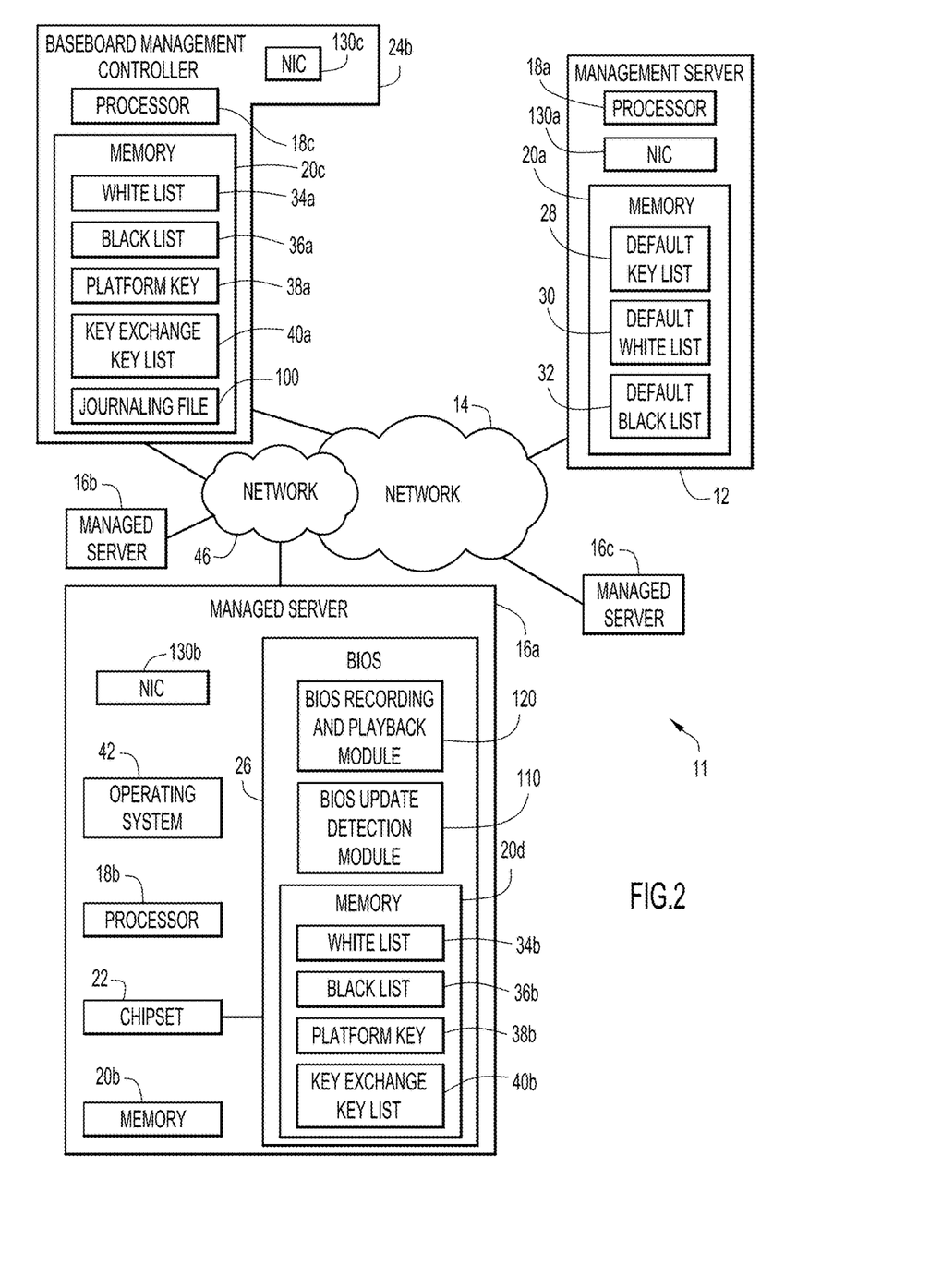
FIG. 2 illustrates another example block diagram of a communication system with secure boot variable synchronization functionality in accordance with the techniques presented herein.

FIG. 2 is a block diagram of another communication system 11 configured for management of BIOS secure boot variables in accordance with another aspect of the present disclosure. FIG. 2 illustrates how a BMC (e.g., BMC 24b) need not be co-resident with the managed server 16a. Communication system 11 may include management server 12, networks 14 and 46, managed servers 16a-c, and BMC 24b. Management server 12 may include processor 18a, memory 20a, and a network interface unit or card (NIC) 130a. Memory 20a may include default key list 28, default white list 30, and default black list 32. Managed server 16a may include processor 18b, memory 20b, chipset 22, operating system (OS) 42, BIOS 26, and a network interface unit or card (NIC) 130b. BIOS 26 may additionally include memory 20d. Memory 20d may include white list 34b, black list 36b, platform key 38b, and key exchange key list 40b. BMC 24b may include processor 18c, memory 20c, and a network interface unit or card (NIC) 130c. Memory 20c may include white list 34a, black list 36a, platform key 38a, and key exchange key list 40a. BMC 24b may communicate with one or more managed servers 16a-c through network 14 and/or network 46. In other aspects, network 46 may be isolated from network 14. NIC 130 is used for receiving and transmitting packets of information across a network.

Figure 3:
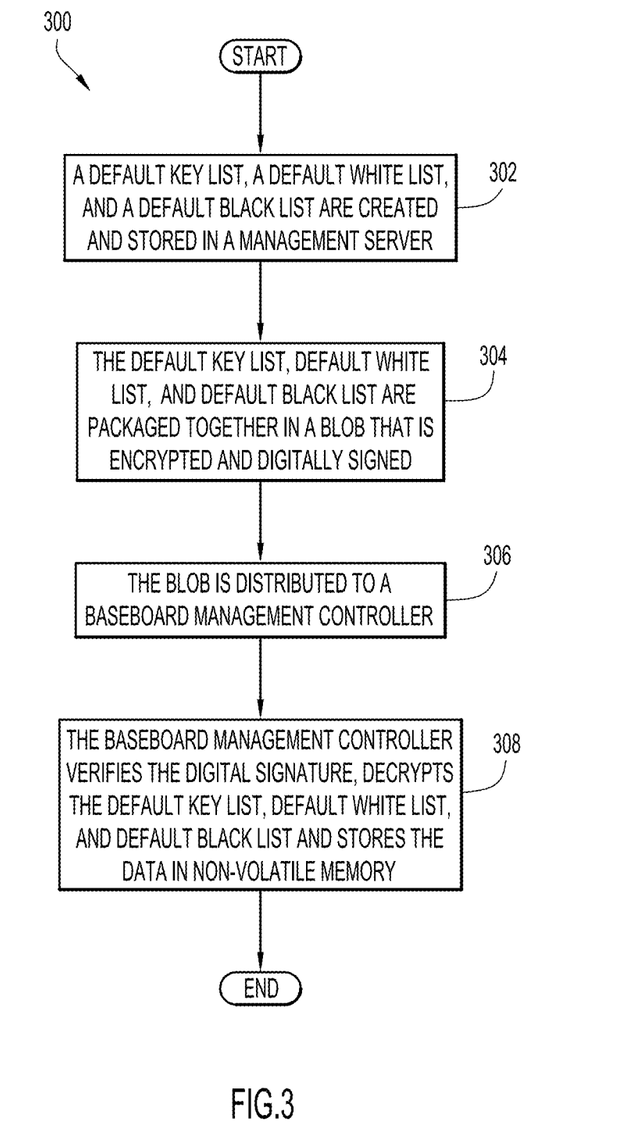
FIG. 3 is an example flow chart depicting operations performed at a communication system in accordance with the techniques presented herein.

FIG. 3 is a flowchart 300 illustrating example activities associated with management for BIOS secure boot variables. At operation 302, a default key list, a default white list, and a default black list are created and stored in a management server. At operation 304, the default key list, default white list, and default black list are packaged together in a BLOB that is encrypted and digitally signed. At operation 306, the BLOB is distributed to a BMC. In one example, the BLOB is securely distributed to a BMC. At operation 308, the BMC verifies the digital signature, decrypts the default key list, default white list, and default black list and stores the data in NVRAM. In other words, flow chart 300 illustrates how default lists and databases are loaded into a BMC.

Figure 4:
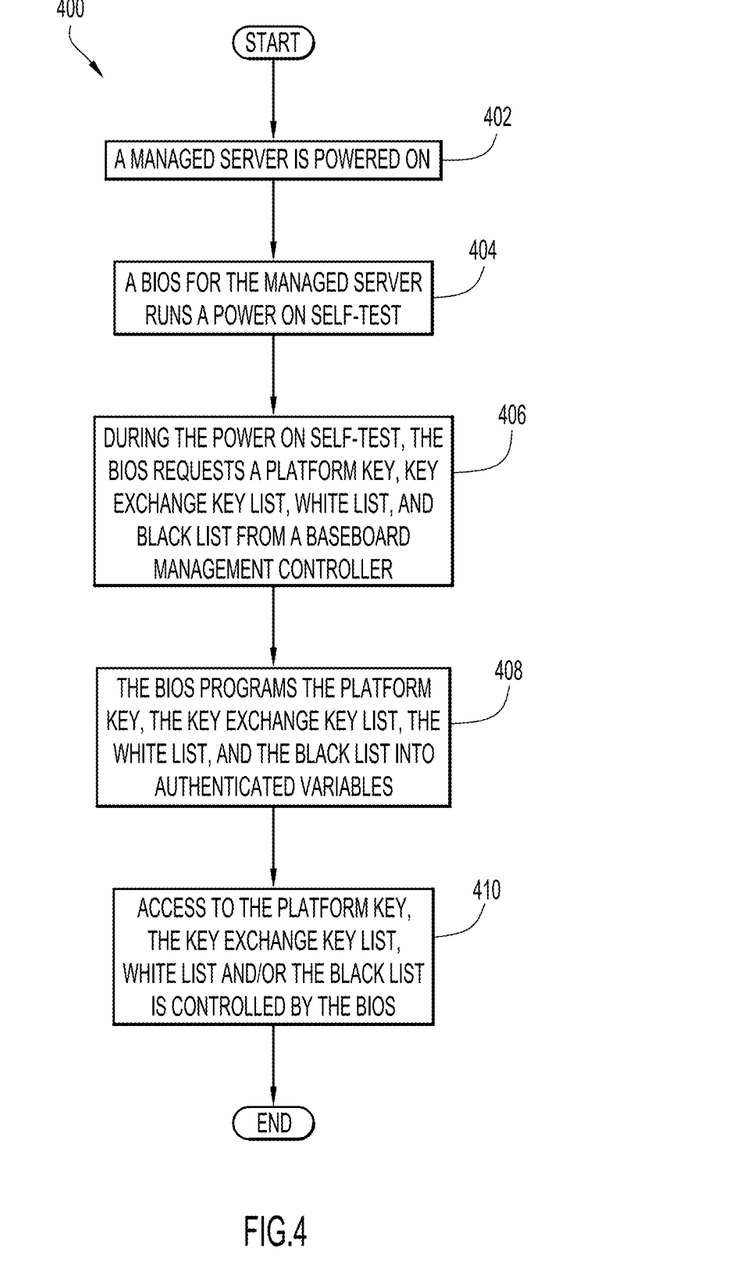
FIG. 4 is an example flow chart depicting operations performed at a physical device upon powering on a managed server according to the techniques presented herein.

FIG. 4 is a flowchart 400 illustrating example activities associated with management for BIOS secure boot variables. At operation 402, a managed server is powered on. At operation 404, a BIOS for the managed server runs a power on self-test. At operation 406, during the power on self-test, the BIOS requests a platform key, key exchange key list, white list, and black list from a BMC. In an example, the platform key, key exchange key list, white list and black list are included in a BLOB of data sent to the BIOS from the BMC. At operation 408, the BIOS programs the platform key, key exchange key list, white list, and black list into authenticated variables (e.g., BIOS secure boot variables). At operation 410, access to the platform key, key exchange key list, white list and/or black list is controlled by the BIOS. In other words, flow chart 400 illustrates how default lists and databases loaded into a BMC are supplied or otherwise transferred to a BIOS.

That is, secure boot variables may be stored in BMC 24a or 24b, and sent to a BIOS during a power on self-test. The power on self-test can be associated with any particular computer, computing device, etc. As explained previously, the BIOS may utilize the secure boot variables during runtime to authenticate drivers and an operating system loader. In particular embodiments, the secure boot variables may be included in a white list, a black list, and/or a key list and stored in NVRAM or erasable programmable read only memory.

Figure 5:
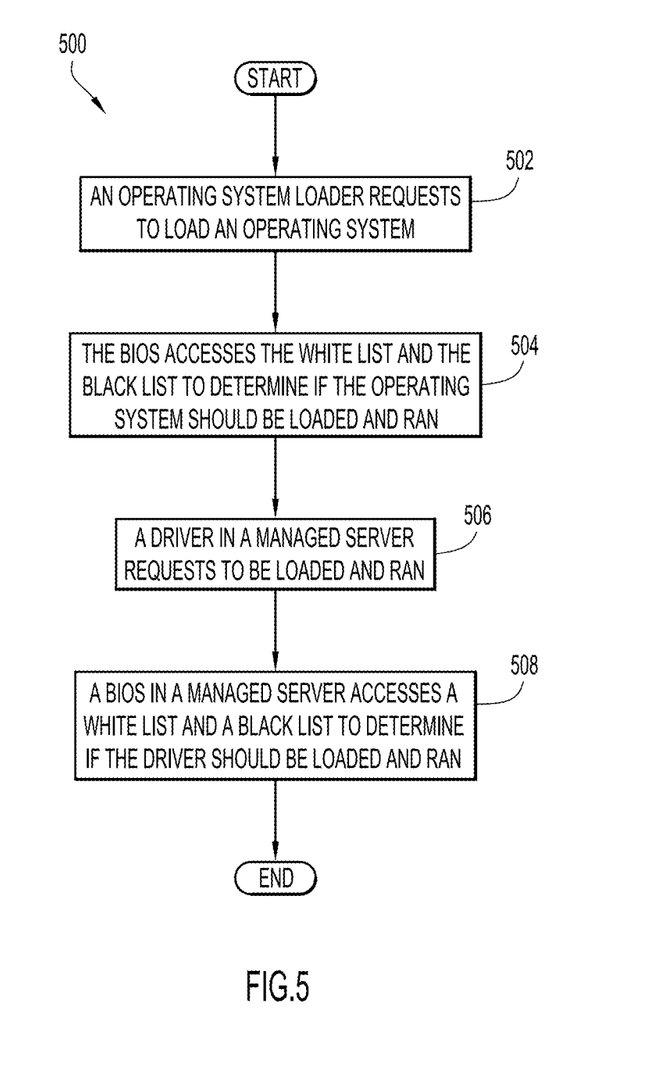
FIG. 5 is an example flow chart depicting operations performed at a physical device in accordance with the techniques presented herein.

FIG. 5 is a flowchart 500 illustrating example activities regarding how BIOS secure boot variables manage a request for a selected operation, namely the loading of an OS. At operation 502, an OS loader requests to load an OS. At operation 504, the BIOS accesses a white list and a black list to determine if the OS should be loaded and run. For example, if the OS is included in the white list, then the OS is loaded and allowed to run. Conversely, if the OS is included in the black list, then the OS is not loaded and not allowed to run. In one implementation, if the OS is not included in the white list or the black list, then remedial action may be taken. For example, a user managing the system real-time may be notified and the fact that the OS was not listed may be logged. Also, if the OS is not included in the white list or the black list, then it may be the case that the system is misconfigured.

At operation 506, a driver in a managed server requests to be loaded and run. At operation 508, a BIOS in a managed server accesses the white list and/or the black list to determine if the driver should be loaded and run. For example, if the driver is included in the white list, then the driver is loaded and allowed to run. Conversely, if the driver is included in the black list, then the driver is not loaded and not allowed to run. In another implementation, if the driver is not included in the white list or the black list, then remedial action is taken. For example, a user managing the system real-time may be notified and the fact that the driver was not listed may be logged. Also, if the driver is not included in the white list or the black list, then typically the system is misconfigured. As will be appreciated by those skilled in the art, by maintaining appropriate white and/or black lists etc., the BIOS can more effectively control operations of the computing device for which it is responsible.

Figure 6:
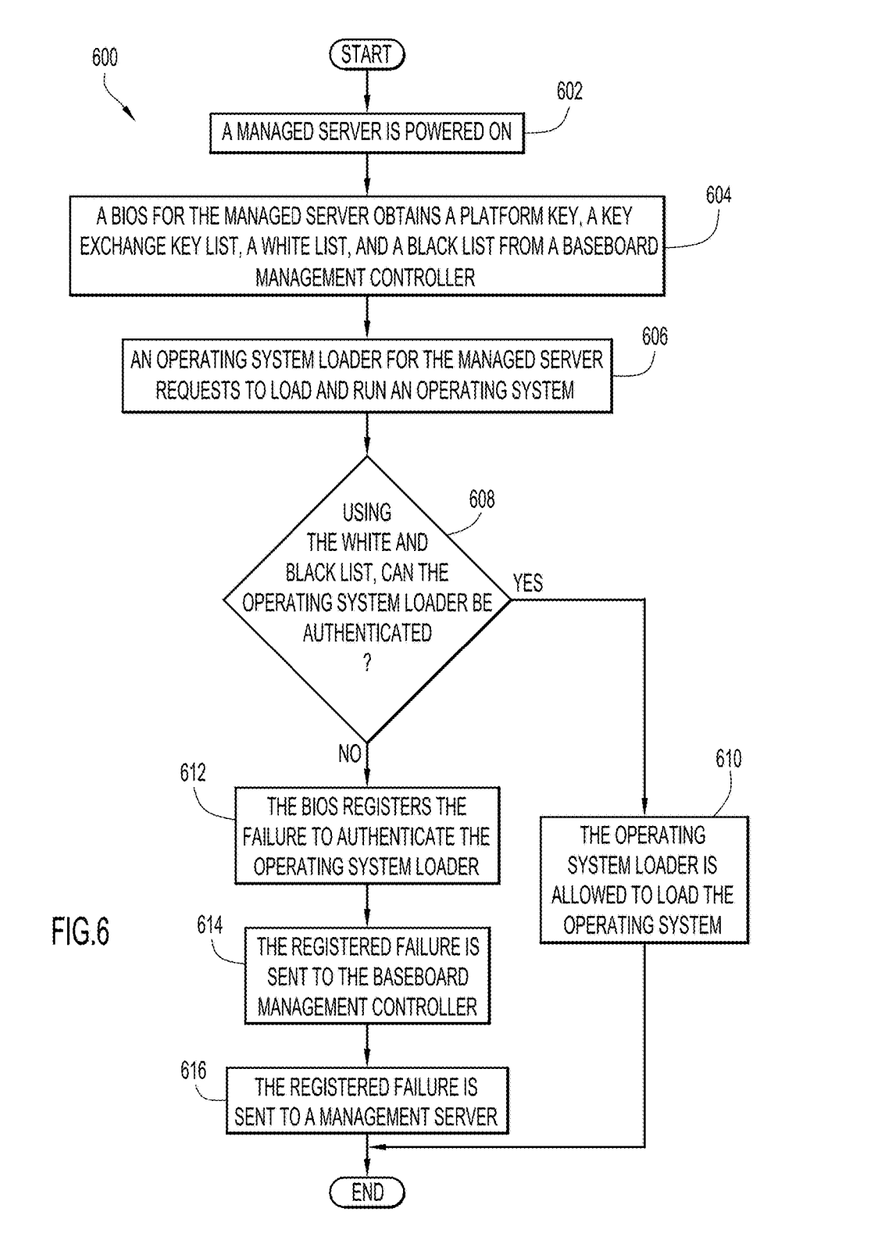
FIG. 6 is an example flow chart depicting operations performed at a physical device in accordance with the techniques presented herein.

FIG. 6 is a flowchart 600 illustrating example activities associated with management for BIOS secure boot variables. At operation 602, a managed server is powered on. At operation 604, a BIOS for the managed server obtains a platform key, a key exchange key list, a white list, and a black list from a BMC. In one example, the platform key, key exchange key list, white list, and black list may be included in a BLOB. At operation 606, an OS loader for the managed server requests to load and run an OS. At operation 608, using the white list and the black list, the system determines if the OS loader can be authenticated. If the OS loader can be authenticated, then the OS loader is allowed to load the OS, as in operation 610. If the OS loader cannot be authenticated, then the BIOS registers the failure to authenticate the OS loader, as in operation 612. At operation 614, the registered failure is sent to the BMC. At operation 616, the registered failure is sent to a management controller or server. In another example, the failure is sent to the management server by the BMC. Thus, this example illustrates how the managed server handles requests that are authenticated as well requests that cannot be authenticated.

Figure 7:
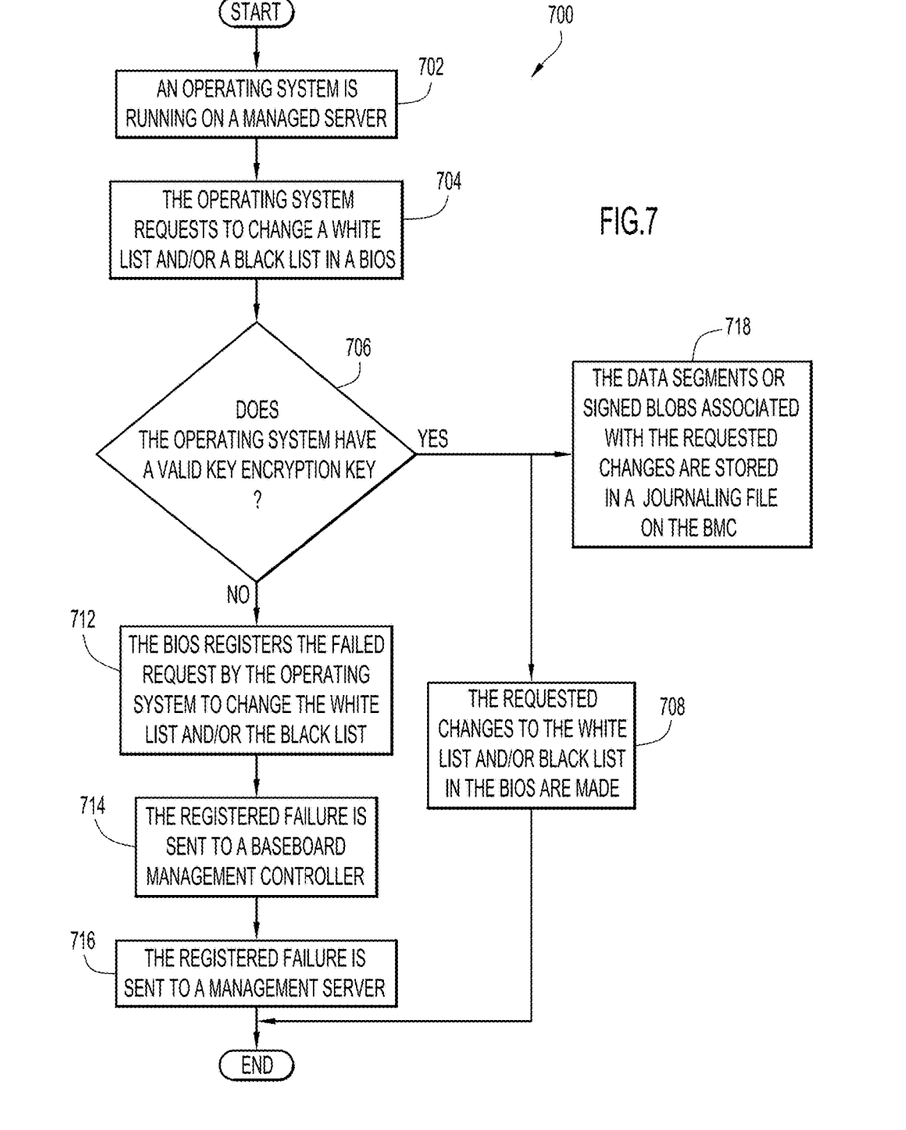
FIG. 7 is an example flow chart depicting operations performed at a physical device in accordance with the techniques presented herein.

FIG. 7 is a flowchart 700 illustrating example activities associated with management for BIOS secure boot variables, and in particular, illustrates how later changes (i.e., changes from an OS) to a BIOS can be captured, recorded and/or stored so that these changes can be replayed or restored to the BIOS at some later time. At operation 702, an OS is running on a managed server. At operation 704, the OS requests to change a white list and/or black list in a BIOS. At operation 706, the system determines if the OS has a valid key encryption key. For example, the BIOS may use a key exchange key list (e.g., key exchange key list 40b) to determine if the OS has a valid encryption key. If the OS has a valid key encryption key, then the requested changes to the white list and/or the black list in the BIOS are made, as in operation 708. After the request is authenticated at operation 706, signed BLOBs or data segments associated with the requested changes to the white and/or black lists are, at operation 718, recorded or stored in a journaling file (e.g., journaling file 100, FIG. 1) in the memory of the BMC. More specifically, a data segment associated with a first request to change the white list and/or the black list of the BIOS is stored at the beginning (or top) of the file (e.g., journaling or recording file 100), and respective data segments of each subsequent request are appended to the data in this file. In this manner, a time-sequenced list of authenticated BLOBs or data segments may be generated and stored. If at operation 706 it was determined that the OS does not have a valid encryption key, then the BIOS registers the failed request by the OS to change the white list and/or the black list, as in operation 712. At operation 714, the registered failure is sent to a BMC. At operation 716, the registered failure is sent to a management controller or server. In another example, the failure is sent to the management server by the BMC.

As discussed previously, certain environments, such as Cisco's Unified Computing System (UCS)® server system, may not always be situated such that methods driven by UEFI specifications directly apply. For example, a BIOS image may be updated, e.g., asynchronously, according to other standard protocols without the OS or other associated platform having any knowledge of the update. Additionally, the update may be a complete or a partial update. Accordingly, a BIOS update detection module 110 and a journaling (recording) and restoration (playback) module 120 are provided, and as described in FIGS. 8-11, help maintain coherency between the white and black lists in the BIOS and the white and black lists in the BMC. Although the BIOS update detection module 110 and the record and playback module 120 are both depicted inside the BIOS, this illustration is purely an example; a skilled practitioner would understand that this functionality may be implemented elsewhere.

Figure 8:
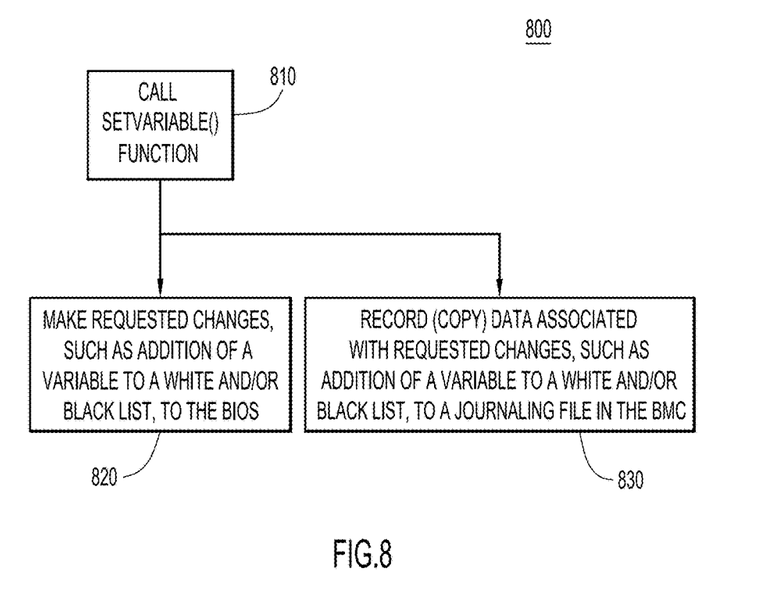
FIG. 8 is an example flow chart depicting recording functionality in accordance with the techniques presented herein.

FIG. 8 shows an example recording schema 800 using an API function (e.g., SetVariable( )) configured to change the white and/or black lists of the BIOS. According to UEFI specification, a small set of runtime programs, e.g., functions such as SetVariable( ) may be called, as shown in operation 810, by a properly credentialed OS or other entity to modify the white and/or black lists of the BIOS. These runtime programs (e.g., OS) may pass, using the API function, a BLOB (which may be signed) or data segment to the BIOS. Upon receipt, the BIOS confirms that the requesting entity has the proper authorization to request changes, and contingent upon this authorization, adds the requested changes to the BIOS NVRAM as shown in operation 820. At substantially the same time, the API function (e.g., SetVariable( )) is further configured to enable an entry (e.g., a signed BLOB or data segment) to be created and stored in the journaling file 100 in the NVRAM of the BMC, as shown in operation 830. A copy of the data segment is stored only after being authenticated. The data segment may comprise signed data in the form of a BLOB.

In summary, when a credentialed entity initiates a request to change the BIOS via a function such as SetVariable( ) as in operation 810, requested changes from a properly credentialed entity can be implemented in the white and/or black lists of the BIOS (as shown in operation 820), and such changes may also be recorded in the journaling file 100 (as shown in operation 830). Consequently, an exact copy of the secure variable BLOBs or data segments, comprising UEFI-specified signature lists that are passed to the BIOS for authentication prior to updating the white and/or black lists, can be created and stored, e.g., in BMC 24a or 24b, for future use.

Thus, the techniques presented herein allow the creation of separate sets of lists/databases in the BMC's NVRAM such that the default structures, including default white lists and black lists, e.g., supplied from management server 12, as well as later OS-initiated white and black list updates, are retained.

Figure 9:
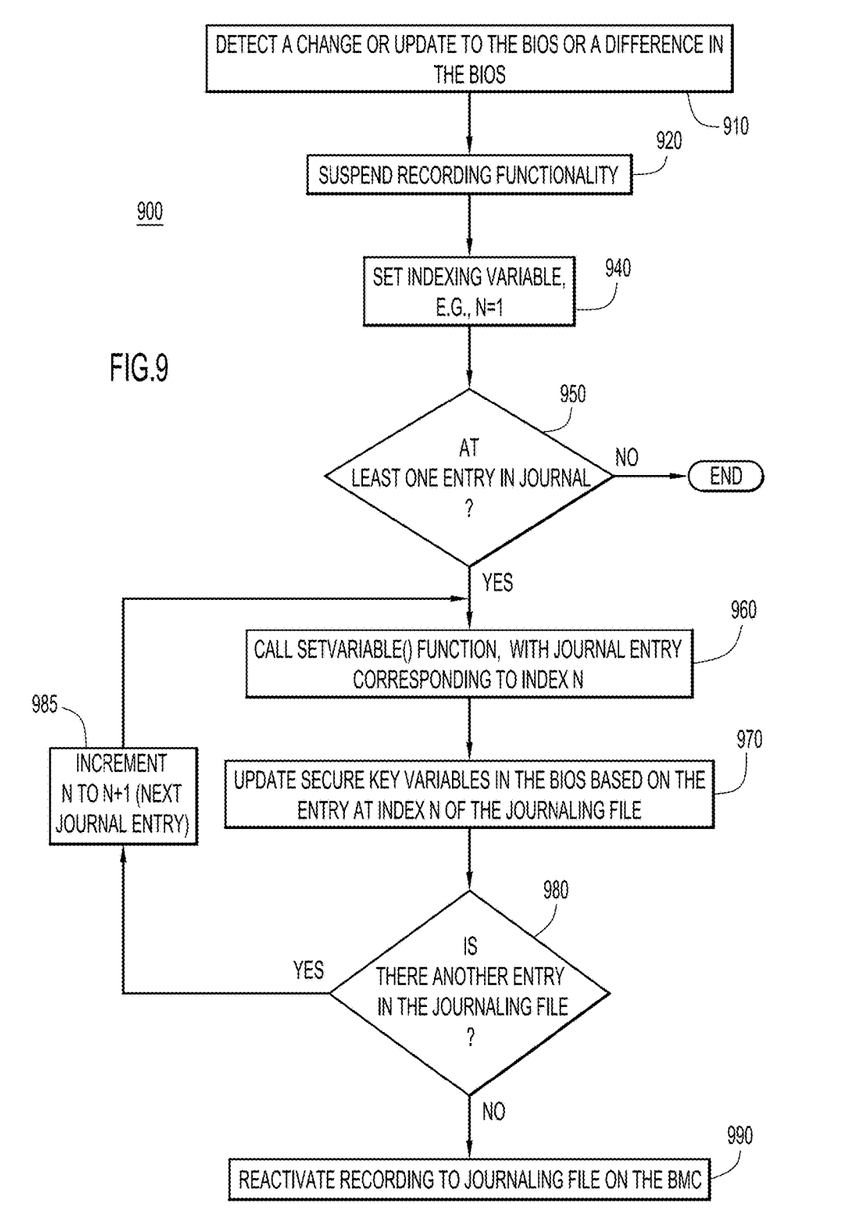
FIG. 9 is an example flow chart depicting playback functionality in accordance with the techniques presented herein.

FIG. 9 shows an example set of operations in connection with playback module 900, which coordinates restoration of BIOS changes that have been previously recorded in a BMC. In one possible embodiment, the BIOS uses the same API function call (e.g. SetVariable( )) to synchronize the white and/or black lists of the BIOS with the white and/or black lists of the BMC.

Specifically, at operation 910, the BIOS update detection module 110 (e.g., FIG. 1) detects that an update has occurred in the platform BIOS image resulting in the loss of, e.g., one or more UEFI variables in the BIOS. In other words, the update erased or deleted a portion of the BIOS, and thus, the BMC's UEFI secure variables are deemed to be out-of-sync with the secure variables of the runtime BIOS (the live BIOS). At operation 920, prior to initiating restoration, recording functionality is suspended. Suspending recording functionality ensures that changes made during the restoration or playback process will not be included in the journaling file 100 during instant playback operation. In another possible implementation (not shown), the BIOS will then cross-check the default white and/or black lists or databases of the BMC (e.g., white list 34*a*, black list 36*a*, platform key 38*a* and key exchange key list 40*a*) against the runtime BIOS authenticated variables, to ensure synchrony. Such default lists may be obtained, as appropriate, in accordance with, e.g., FIG. 4. In response, and in accordance with the techniques described herein, playback of each white and black list update stored in the journaling file 100 (e.g., changes made by the OS) of the BMC NVRAM may be executed.

Specifically, at operation 940, an indexing variable is initialized to reference the earliest entry in the time-sequenced journaling file. At operation 950, the recording and playback module determines that at least one entry in journaling file 100 exists. At operation 960, the SetVariable( ) function or other appropriate function is called by the BIOS, to pass the entry (e.g., BLOB of data) corresponding to a position in the journaling file 100 as determined by index N, in order to restore the additions an OS may have made earlier. At operation 970, the secure key variables in the BIOS are updated based upon the information (e.g., signed BLOB or data segment) passed to the BIOS via the SetVariable ( ) function. At operation 980, it is determined whether another entry exists in the journaling file 100. If there is a subsequent entry, the index N is incremented by 1 to reference the next entry, as shown in operation 985, and the operation repeats until reaching the last entry in the file. Once the last entry has been passed to the BIOS, at operation 990, reactivation of recording to the journaling file is reinstated. That is, once the secure boot variables in the BIOS have been synchronized with the secure boot variables in the BMC, recording is turned back on to ensure that any future changes to the BIOS will be captured in the recording file 100. It is noted that certain operations described in this figure, e.g., operations 940 and 950, and 980 and 985, etc. may be interchangeable.

By performing playback in this manner, the BIOS will always have a proper set of both default UEFI secure boot keys and the other (e.g., OS-initiated) updates to the white and/or black lists, regardless of whether the BIOS has been updated or not.

Figure 10:
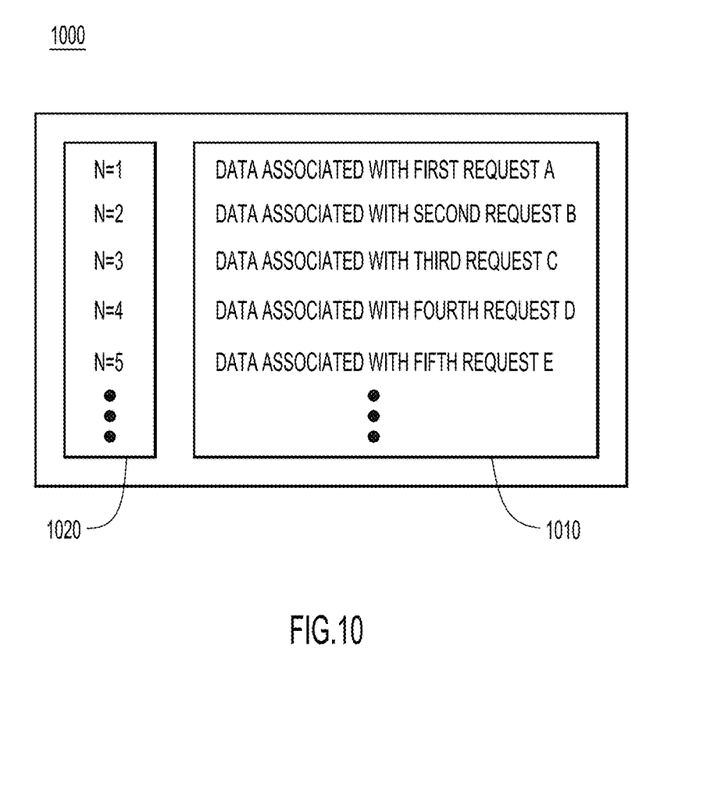
FIG. 10 is an example structure of a recording file and associated index in accordance with the techniques presented herein.

FIG. 10 shows an example configuration 1000 of a journaling or recording file 100. As shown, a data segment or BLOB associated with each requested change 1010 (Requests A-E) is stored in a time-sequenced list according to the order of request. The index N 1020 is shown to indicate ordering of the list, e.g., N=1 shows the first requested change, N=2 shows the second requested change, and so forth. Thus, according to the techniques disclosed herein, a plurality of data segments may be stored within the file on the BMC. As part of the process of restoration, each data segment of the plurality of data segments stored in the file in the BMC is used to update the BIOS. Once this process completes, journaling is reactivated.

Figure 11:
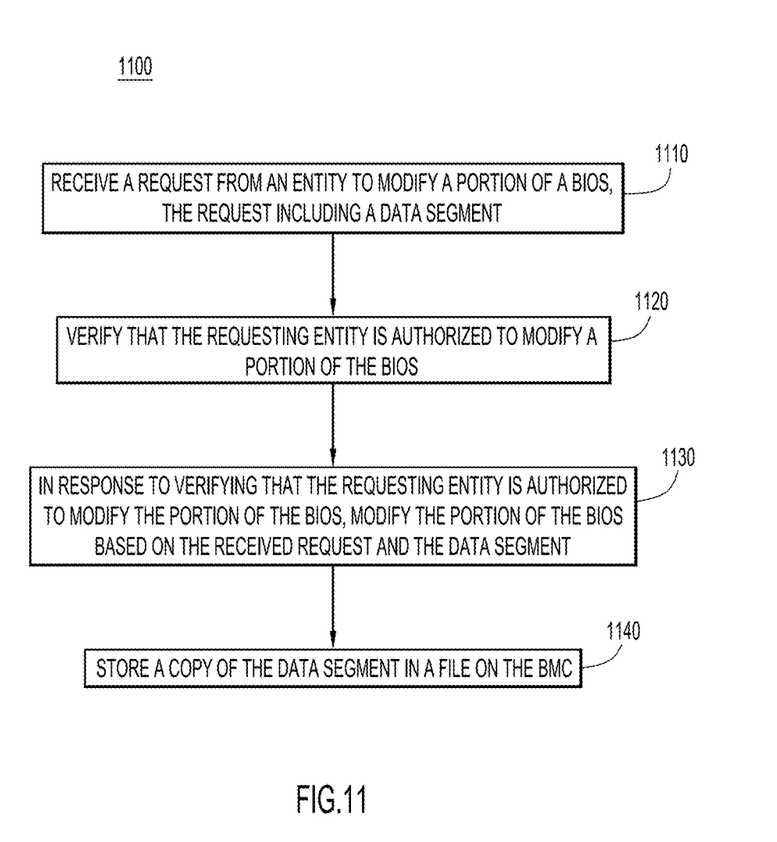
FIG. 11 is an example flow chart depicting a process for storing a copy of the data segment in accordance with the techniques presented herein.

FIG. 11 shows a process 1100 for storing a copy of the data segment, according to the techniques disclosed herein. At operation 1110, a request is received from an entity to modify a portion of a BIOS, the request including a data segment. At operation 1120, it is verified that the requesting entity is authorized to modify a portion of the BIOS. At operation 1130, in response to verifying that the requesting entity is authorized to modify the portion of the BIOS, the portion of the BIOS is modified based on the received request and the data segment. At operation 1140, a copy of the data segment is stored in a file on the BMC.

Those skilled in the art will appreciate that the techniques presented herein may also be used to ensure coherent lists in a server having one or more BIOS. For example, given a server with two BIOS; it may be desirable to switch from a primary BIOS to a secondary BIOS. However, the white and/or black lists from the primary BIOS may not be synchronized with the white and/or black lists of the secondary BIOS. By using the techniques herein, the secondary BIOS may be updated to be in complete synchrony with the primary BIOS.

In this example, a BIOS switch detection module (not shown) would detect when a switch had occurred from a primary BIOS to a secondary BIOS. Upon detection of a switch, the BIOS would cross check default secure variable databases against the runtime BIOS authenticated variables to ensure synchrony. Additionally, the system would initiate playback of the journaling file, according to the techniques disclosed herein, to modify the white and/or black lists of the secondary BIOS according to the requests stored in the journaling file. As described previously, recording of requests to file 100 is turned off during playback. Once playback completes, recording is reinstated.

Advantages of the techniques presented herein include providing assurance to an OS provisioned and launched onto a managed server (e.g., Cisco's UCS® managed server) that any changes made to the white and/or black lists for UEFI Secure Boot will be faithfully retained on that platform and its secure boot state will be trustworthy. Without this capability, when BIOS updates and changes occur, an OS may have no way to ensure that the platform's white and/or black lists are properly maintained.

In summary, the techniques presented herein allow an OS that supports secure boot to add entries to the secure boot white list and/or black list using an interface suitable for accessing a BIOS, e.g., the UEFI BIOS interface SetVariable( ) function. The updated white and/or black lists are stored as UEFI variables in BIOS NVRAM. As the contents of BIOS NVRAM may be erased during certain system operations, the techniques presented herein allow a method to preserve and restore additions and changes to the white and/or blacks lists, e.g., changes made by an OS. The BMC contains nonvolatile storage in which the baseline secure boot variables are stored along with a time-sequenced record of OS additions to the white and black list databases. When an API function call, such as SetVariable( ) is called, the data associated with the call is recorded to BMC storage. Subsequently, if the BIOS NVRAM determines that secure variables in the BIOS are incomplete or missing, e.g., due to switching from a primary BIOS to a secondary BIOS, or due to a BIOS change or update, the secure variables may be restored to the BIOS from the BMC storage via the default files and the journaling file by a playback function that uses, e.g., the same API function call used to initially update the BIOS, e.g., SetVariable( ) and the stored data segments. In other words, the portion of the BIOS (e.g., comprising authenticated variables) may be restored based upon the stored data segments in the file on the BMC.

It should be expressly understood that the instant record and playback mechanism is not restricted to restoring BIOS NVRAM that may have been erased or updated.

In an effort to maintain proper operation, upon complete re-provisioning of a given managed server, the BMC will expunge any journaling files, which comprise a record of the OS-initiated white and/or black list updates as well as possible other calls to the API function SetVariable ( ) thus allowing the platform to erase any knowledge of the previous tenant.

It should be appreciated that the techniques described above in connection with all embodiments may be performed by one or more computer readable storage media that is encoded with software comprising computer executable instructions to perform the methods and steps described herein. For example, the operations performed by the managed server may be performed by one or more computer or machine readable storage media (e.g., non-transitory) or devices executed by a processor and comprising software, hardware or a combination of software and hardware to perform the techniques described herein. The functions of the processor, e.g., processor 18b, may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor (e.g., processors 18a-c shown in FIGS. 1 and 2), or other similar machine, etc.)

In general, memory 20a-d may comprise one or more tangible (e.g., non-transitory) computer readable storage media (e.g., a memory device) encoded with software comprising computer executable instructions, and when the software is executed by the processor, the processor is operable to perform the operations described herein in connection with restoration (playback) and journaling (recording or storing) logic. In other approaches, secure variables are stored in one or more lists or databases accessible by processor 18b. Any of these elements (e.g., the network elements, etc.) can include memory elements for storing information to be used in supporting management of BIOS secure boot variables, as outlined herein. Additionally, each of these devices may include a processor that can execute software or an algorithm to perform the activities of management of BIOS secure boot variables as discussed in this specification. In one example, the processor could transform an element or an article (e.g., data) from one state or thing to another state or thing. These devices may further keep information in any suitable memory element (random access memory (RAM), FPGA, ROM, EPROM, EEPROM, ASIC, etc.), software, hardware, or in any other suitable component, device, element, or object where appropriate and based on particular needs.

Any of the memory items discussed herein should be construed as being encompassed within the broad term 'memory element.' Similarly, any of the potential processing elements, modules, and machines described in this specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication systems 10 and 11 are readily scalable and, further, can accommodate a large number of components, as well as more complicated/sophisticated arrangements and configurations. Accordingly, the examples provided should not limit the scope or inhibit the broad teachings of communication systems 10 and 11, as potentially applied to a myriad of other architectures.

It is also important to note that the steps in the preceding figures illustrate only some of the possible scenarios that may be executed by, or within, communication systems 10 and 11. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 10 and 11 in that any suitable arrangements, chronologies, configurations, and timing mechanisms may be provided without departing from the teachings of the present disclosure.

Network 14 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

In one implementation, BMC 24a may include software to achieve activities associated with management of BIOS secure boot variables, as discussed herein. Additionally, each element can have an internal structure (e.g., a processor, a memory element, etc.) to facilitate some of the operations described herein. In other embodiments, the management of BIOS secure boot variables may be executed externally to BMC 24a, or included in some other network element to achieve the intended functionality. Alternatively, BMC 24a may include software (or reciprocating software) that can coordinate with other network elements in order to achieve the support of management of BIOS secure boot variables as described herein. In still other embodiments, one or several devices may include any suitable algorithms, hardware, software, components, modules, interfaces, or objects that facilitate the operations thereof. BMC 24a is further considered as a network element that can facilitate management of BIOS secure boot variables as discussed herein.

Management server 12 and managed server 16*a* can be associated with devices or users wishing to receive or communicate data or content in communication systems 10 and 11 via one or more networks. The term 'server', 'management server', and 'managed server' are inclusive of a physical computer (a computer hardware system) or virtual machine dedicated to run one or more services (as a host) and to serve the needs of users of other computers on a network. Depending on the computing service that the managed server offers, managed server could be a database server, file server, mail server, print server, web server, gaming server, or some other kind of server. Managed servers 16*a-c* may also be any device that seeks to initiate a communication on behalf of another entity or element, such as a program, a database, or any other component, device, element, or object capable of initiating an exchange within communication systems 10 and 11. Data, as used herein in this document, refers to any type of numeric, voice, video, media, or script data, or any type of source or object code, or any other suitable information in any appropriate format that may be communicated from one point to another.

As used herein in this specification, the term 'network element' is meant to encompass any of the aforementioned endpoints, as well as routers, switches, cable boxes, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In summary, a method is provided comprising: at a managed server, receiving a request from an entity to modify a portion of a basic input/output system (BIOS), the request including a data segment, and verifying that the requesting entity is authorized to modify a portion of the BIOS. In response to verifying that the requesting entity is authorized to modify the portion of the BIOS, the portion of the BIOS is modified based on the received request and the data segment; and a copy of the data segment is stored in a file on a baseboard management controller (BMC) that is communicatively coupled to the BIOS.

In addition, an apparatus is provided comprising a network interface unit configured to receive communications over a network; a processor coupled to the network interface unit, and a memory. The processor is configured to: receive a request, at a managed server, from an entity to modify a portion of a basic input/output system (BIOS), the request including a data segment; verify that the requesting entity is authorized to modify a portion of the BIOS; modify the portion of the BIOS based on the received request and the data segment, in response to verifying that the requesting entity is authorized to modify the portion of the BIOS; and store a copy of the data segment in a file on a baseboard management controller (BMC) that is communicatively coupled to the BIOS.

Furthermore, a computer readable media is provided encoded with software comprising computer executable instructions and when the software is executed operable to: receive a request, at a managed server, from an entity to modify a portion of a basic input/output system (BIOS), the request including a data segment; verify that the requesting entity is authorized to modify a portion of the BIOS; modify the portion of the BIOS based on the received request and the data segment, in response to verifying that the requesting entity is authorized to modify the portion of the BIOS; and store a copy of the data segment in a file on a baseboard management controller (BMC) that is communicatively coupled to the BIOS.

The above description is intended by way of example only. Various modifications and structural changes may be made therein without departing from the scope of the concepts described herein and within the scope and range of equivalents of the claims.

What is claimed is:

1. A method comprising:
   at a managed server, receiving a request from an entity to modify a portion of a basic input/output system (BIOS) of a network device, the request including a data segment and received outside a runtime environment of the network device;
   verifying that the requesting entity is authorized to modify a portion of the BIOS;
   in response to verifying that the requesting entity is authorized to modify the portion of the BIOS, modifying the portion of the BIOS based on the received request and the data segment via operations performed by the BIOS that by-pass an operating system of the network device;
   storing a copy of the data segment in a file on a baseboard management controller (BMC) that is communicatively coupled to the BIOS, via operations performed by the BIOS that by-pass the operating system of the network device, wherein the file comprises a plurality of data segments each of which indicates a modification of the BIOS; and
   in response to detecting that the portion of the BIOS has been erased or deleted, restoring the portion of the BIOS using the stored data segment in the file on the BMC via operations performed by the BIOS that by-pass the operating system of the network device,
   wherein storing the copy of the data segment in the file on the BMC comprises sending an encrypted message that includes the data segment from the BIOS to the BMC over a secure interface.

2. The method of claim 1, wherein modifying the portion of the BIOS comprises modifying at least one of a white list, a black list, or a key list in the BIOS.

3. The method of claim 1, wherein receiving a request further comprises receiving a Unified Extensible Firmware Interface (UEFI) boot variable.

4. The method of claim 1, wherein storing a copy of the data segment further comprises storing the segment within the plurality of segments in a time-sequenced manner.

5. The method of claim 1, wherein storing a copy of the data segment further comprises storing signed data in the form of a binary large object (BLOB) only after such signed data has been authenticated by the BIOS.

6. The method of claim 1, further comprising:
   detecting that the portion of the BIOS has been erased or deleted.

7. The method of claim 1, further comprising:
   prior to restoring, suspending storing the plurality of data segments in the file on the BMC.

8. The method of claim 7, further comprising:
   determining that each data segment of the plurality of data segments stored in the file on the BMC has been used to modify the BIOS; and reactivating storing the data segments in the file on the BMC, in response to determining that each data segment of the plurality of data segments has been used to modify the BIOS.

9. The method of claim 1, further comprising:
re-provisioning the managed server by erasing the copy of the data segment stored in the file on the BMC.

10. An apparatus comprising:
a network interface unit configured to receive communications over a network; and
a processor coupled to the network interface unit and a memory and configured to:
   receive a request, at a managed server, from an entity to modify a portion of a basic input/output system (BIOS), the request including a data segment and received outside a runtime environment of the apparatus;
   verify that the requesting entity is authorized to modify a portion of the BIOS;
   modify the portion of the BIOS based on the received request and the data segment in response to verifying that the requesting entity is authorized to modify the portion of the BIOS via operations performed by the BIOS that by-pass an operating system of the apparatus;
   store a copy of the data segment in a file on a baseboard management controller (BMC) that is communicatively coupled to the BIOS, via operations performed by the BIOS that by-pass the operating system of the apparatus, wherein the file comprises a plurality of data segments each of which indicates a modification of the BIOS; and
   in response to detecting that the portion of the BIOS has been erased or deleted, restore the portion of the BIOS using the stored data segments in the file on the BMC via operations performed by the BIOS that by-pass the operating system of the apparatus,
   wherein the processor is configured to store the copy of the data segment in the file on the BMC by sending an encrypted message that includes the data segment from the BIOS to the BMC over a secure interface.

11. The apparatus of claim 10, wherein the processor is further configured to:
   store the copy of the data segment by storing signed data in the form of a binary large object (BLOB) only after such signed data has been authenticated.

12. The apparatus of claim 10, wherein the processor is further configured to:
   determine, for the plurality of data segments stored in the file on the BMC, that each data segment of the plurality of data segments has been used to modify the BIOS; and
   reactivate storing the data segments in the file on the BMC, in response to determining that each data segment of the plurality of data segments has been used to modify the BIOS.

13. One or more non-transitory computer readable storage media encoded with software comprising computer executable instructions and when the software is executed operable to:
   receive a request, at a managed server, from an entity to modify a portion of a basic input/output system (BIOS) of a network device, the request including a data segment and received outside a runtime environment of the network device;
   verify that the requesting entity is authorized to modify a portion of the BIOS;
   modify the portion of the BIOS based on the received request and the data segment in response to verifying that the requesting entity is authorized to modify the portion of the BIOS via operations performed by the BIOS that by-pass an operating system of the network device;
   store a copy of the data segment in a file on a baseboard management controller (BMC) that is communicatively coupled to the BIOS, via operations performed by the BIOS that by-pass the operating system of the network device, wherein the file comprises a plurality of data segments each of which indicates a modification of the BIOS; and
   in response to detecting that the portion of the BIOS has been erased or deleted, restore the portion of the BIOS using the stored data segment in the file on the BMC via operations performed by the BIOS that by-pass the operating system of the network device,
   wherein the instructions operable to store the copy of the data segment in the file on the BMC are operable to send an encrypted message that includes the data segment from the BIOS to the BMC over a secure interface.

14. The non-transitory computer readable storage media of claim 13, further comprising instructions operable to:
   store the copy of the data segment by storing signed data in the form of a binary large object (BLOB) only after such signed data has been authenticated.

15. The non-transitory computer readable storage media of claim 13, further comprising instructions operable to:
   detect that the portion of the BIOS has been erased or deleted.

16. The non-transitory computer readable storage media of claim 15, further comprising instructions operable to:
   suspend, prior to restoring the portion of the BIOS, storing a copy of the data segment in the file on the BMC.

17. The non-transitory computer readable storage media of claim 13, further comprising instructions operable to:
   determine, for the plurality of data segments stored in the BMC, that each data segment of the plurality of data segments has been used to modify the BIOS; and
   reactivate, in response to determining that each data segment of the plurality of data segments has been used to modify the BIOS, storing the data segments in the file on the BMC.

18. The non-transitory computer readable storage media of claim 13, further comprising instructions operable to:
   re-provision the managed server by erasing the copy of the data segment stored in the file on the BMC.

19. The method of claim 1, wherein detecting that the portion of the BIOS has been erased or deleted comprises detecting a flash over of the BIOS.

20. The apparatus of claim 10, wherein the processor is configured to detect that the portion of the BIOS has been erased or deleted comprises detecting a flash over of the BIOS.

* * * * *